United States Patent [19]

Yuhara et al.

[11] Patent Number: 5,305,509
[45] Date of Patent: Apr. 26, 1994

[54] NON-CONTACT ROTATION WATERPROOF AND DUSTPROOF METHOD AND MACHINE USING THE SAME

[75] Inventors: Hideo Yuhara; Toshio Yagami, both of Aichi, Japan

[73] Assignee: Okuma Corporation, Japan

[21] Appl. No.: 909,718

[22] Filed: Jul. 7, 1992

[30] Foreign Application Priority Data

Jul. 12, 1991 [JP] Japan ................... 3-198597

[51] Int. Cl.⁵ ............... B23B 29/24; F16J 15/447
[52] U.S. Cl. .................................. 29/39; 82/159; 408/35; 277/53; 277/55; 277/57
[58] Field of Search ............ 82/159; 277/53, 55, 277/56, 57; 29/39; 408/35

[56] References Cited

U.S. PATENT DOCUMENTS

| | | | |
|---|---|---|---|
| 2,014,859 | 9/1935 | Mitchell, Jr. | 277/57 |
| 2,740,647 | 4/1956 | Van Pelt | 277/56 |
| 3,999,264 | 12/1976 | Carmen | 74/826 |
| 4,055,095 | 10/1977 | Gramespacher et al. | 82/159 |
| 4,101,180 | 7/1978 | Anderson et al. | 277/53 |
| 4,350,345 | 9/1982 | Kalan et al. | 277/53 |
| 4,363,490 | 12/1982 | Kuehn | 277/56 |
| 4,531,746 | 7/1985 | Amdall et al. | 277/53 |
| 4,743,034 | 5/1988 | Kakabaker et al. | 277/53 |
| 4,819,948 | 4/1989 | Merrifield | 277/56 |
| 4,895,460 | 1/1990 | Grzina | 277/57 |
| 5,029,876 | 7/1991 | Orlando et al. | 277/55 |
| 5,046,718 | 9/1991 | Hay, II | 277/53 |

FOREIGN PATENT DOCUMENTS

| | | | |
|---|---|---|---|
| 18647 | 11/1980 | European Pat. Off. | 277/53 |
| 617239 | 7/1978 | U.S.S.R. | 82/159 |
| 856672 | 8/1981 | U.S.S.R. | 82/159 |

*Primary Examiner*—William E. Terrell
*Attorney, Agent, or Firm*—Evenson, McKeown, Edwards & Lenahan

[57] ABSTRACT

A non-contact rotation waterproof and dustproof method and a machine tool using the same. A viscous fluid is continuously or intermittently supplied to a labyrinth clearance formed between a rotating body and a fixed body from a fluid supply device so as to fill the viscous fluid into the labyrinth clearance to obtain a good non-contact rotation waterproof and dustproof method even when the rotating body is rotated at a low speed or is stopped.

15 Claims, 5 Drawing Sheets

NON-CONTACT ROTATION WATERPROOF AND DUSTPROOF METHOD AND MACHINE USING THE SAME

BACKGROUND OF THE INVENTION i) Field of the Invention

The present invention relates to a non-contact rotation waterproof and dustproof method of a labyrinth clearance formed by uneven surfaces of a fixed part and a rotary part and a machine using the non-contact rotation waterproof and dustproof method.

ii) Description of the Related Arts

In a conventional machine tool such as a lathe, a drilling machine or the like, usually, a turret tool rest for holding a plurality of cutters is provided. A cutter suitable for a processing purpose is mounted onto a turret of the turret tool rest, and the turret is rotated at a low speed until the cutter is moved to a predetermined position. Then, the turret is fixed, and by rotating a material to be processed at a high speed, a cutting processing of the material by the cutter is started.

When a contact seal such as an O-ring or the like is used for a waterproof and dustproof means between the turret and a tool rest body of the turret tool rest, a power loss occurs due to abrasion and a slide resistance to lower the operating efficiency of the machine tool. In order to improve this problem, a non-contact seal is used, as shown in FIG. 1. In FIG. 1, in a turret tool rest, a turret 103 is rotatably mounted on a tool rest body 101. An uneven surface part 102 having an uneven surface is formed on the tool rest body 101 and another uneven surface 104 having an uneven surface facing and corresponding to the uneven surface of the uneven surface part 102 is formed on the turrent 103 so that a labyrinth clearance 105 may be formed between the uneven surfaces of the uneven surface parts 102 and 104. Invasion or penetration of cutting water, chips and the like can be prevented by the labyrinth clearance 105 in this waterproof and dustproof method.

In this conventional waterproof and dustproof method using the labyrinth clearance 105, when the rotation speed of the turret 103 is slow or the turret 103 is stopped, the cutting water, the chips or the like can easily come into the labyrinth clearance 105 and thus the waterproof and dustproof effect will not be realised.

SUMMARY OF THE INVENTION

It is therefore an object of the present invention to provide a non-contact rotation waterproof and dustproof method in view of the aforementioned problems of the prior art, which is capable of providing effective waterproof and dustproof protection in a labyrinth clearance between a fixed body and a rotary body even at a low speed rotation or a stopped state of the rotary body.

It is another object of the present invention to provide a machine using a non-contact rotation waterproof and dustproof method in view of the aforementioned problems of the prior art, which is capable of providing effective waterproof and dustproof protection in a labyrinth clearance between a fixed body and a rotary body even at a low speed rotation or a stopped state of the rotary body.

In accordance with one aspect of the present invention, there is provided a waterproof and dustproof method by a non-contact rotation of a labyrinth clearance between opposite uneven surfaces of a rotating body and a fixed body, comprising supplying a viscous fluid into the labyrinth clearance and filling the labyrinth clearance with the viscous fluid.

In accordance with another aspect of the present invention, there is provided a machine tool having a labyrinth clearance between opposite uneven surfaces of a rotating body and a fixed body, comprising a labyrinth clearance filled with a viscous fluid, and a fluid supply device for supplying the viscous fluid to the labyrinth clearance.

Therefore, the viscous fluid is continuously or intermittently supplied from the fluid supply device to the labyrinth clearance formed by the uneven surfaces provided on the rotating body, which rotates at a low speed or is stopped and the fixed body facing the rotating body.

The viscous fluid is filled into the entire area of the labyrinth clearance by a supply pressure of the fluid supply device, a transfer action caused by the rotation of the rotating body, and a capillary tube phenomenon of the viscous fluid. Since the viscous fluid is continuously or intermittently supplied, the previously supplied viscous fluid is discharged to the outside by being pushed by the newly supplied viscous fluid. That is, the labyrinth clearance is sealed by the viscous fluid so as to prevent an invasion or penetration of cutting water, chips or the like into the labyrinth clearance. Further, since the labyrinth clearance is always filled with new viscous fluid, a non-contact waterproof and dustproof function having a self-cleaning action can be obtained.

BRIEF DESCRIPTION OF THE DRAWINGS

The objects, features and advantages of the present invention will become more apparent from consideration of the following detailed description, taken in conjunction with the accompanying drawings, in which.

DESCRIPTION OF THE PREFERRED EMBODIMENTS

Figure 1:
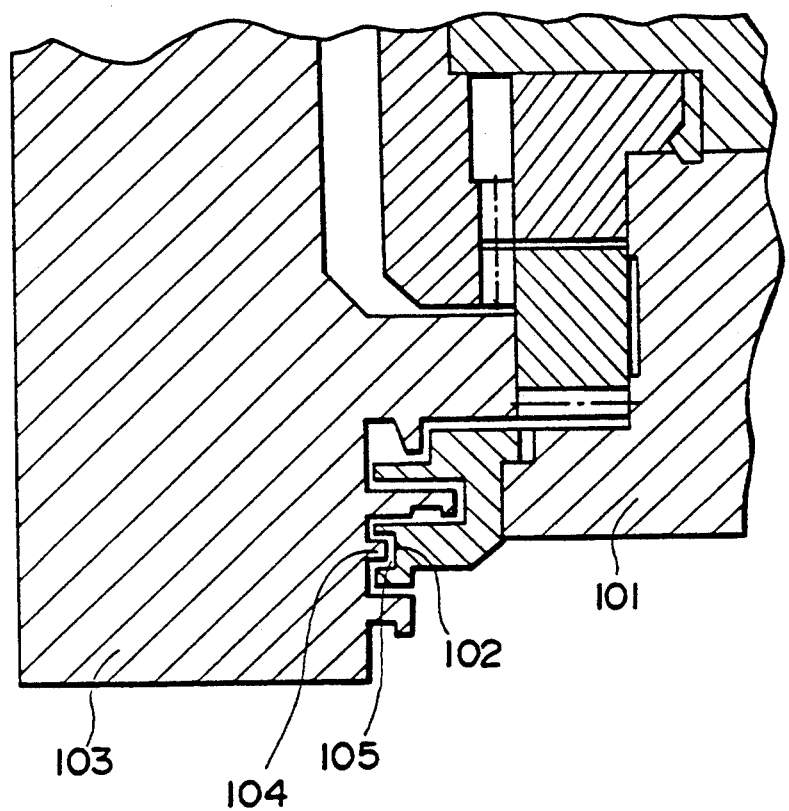
FIG. 1 is an enlarged fragmentary sectional view of a conventional turret tool rest having a labyrinth clearance for a waterproof and dustproof method.
Figure 2:
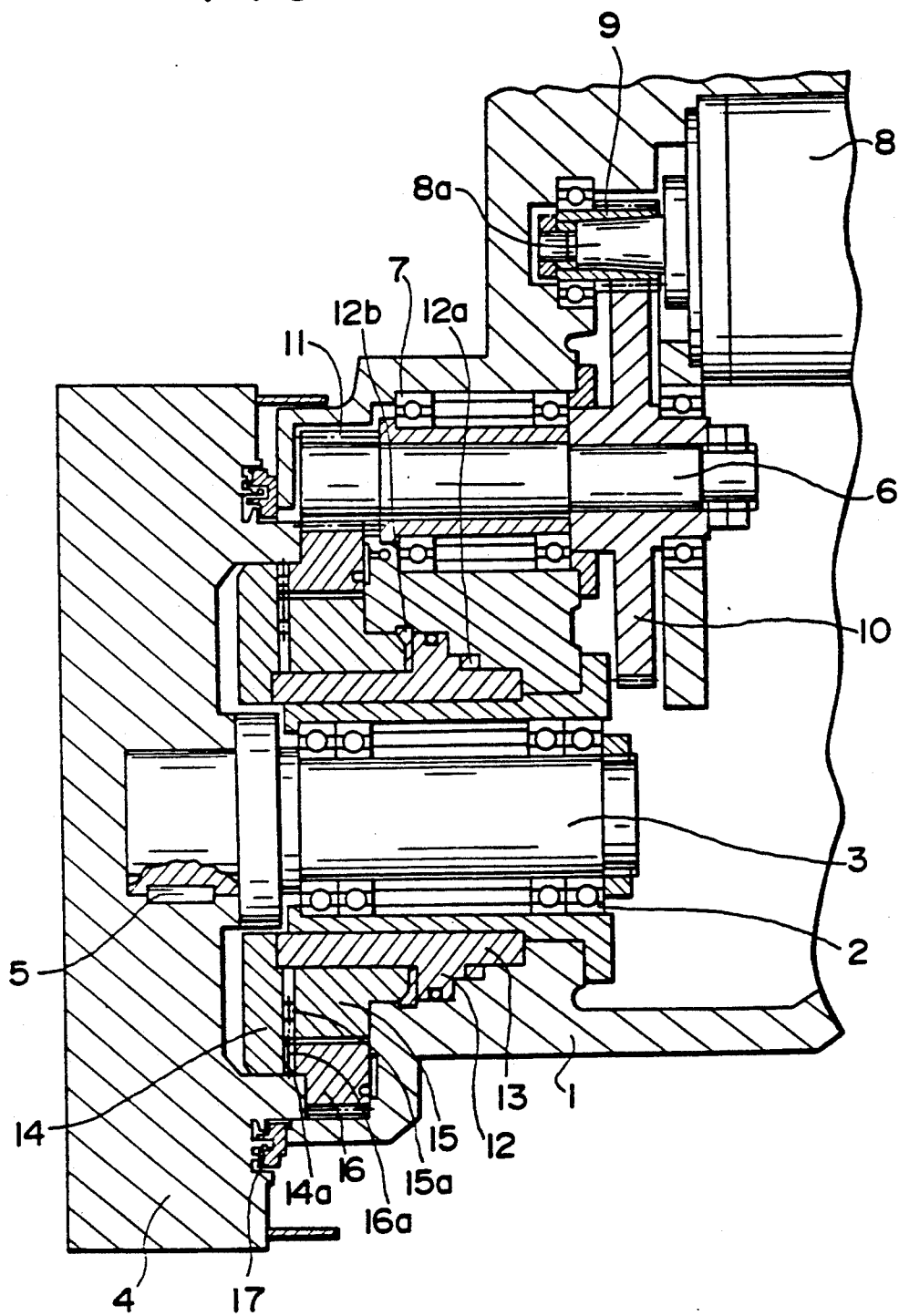
FIG. 2 is a fragmentary sectional view of a turret tool rest of a machine tool according to the present invention.
Figure 3:
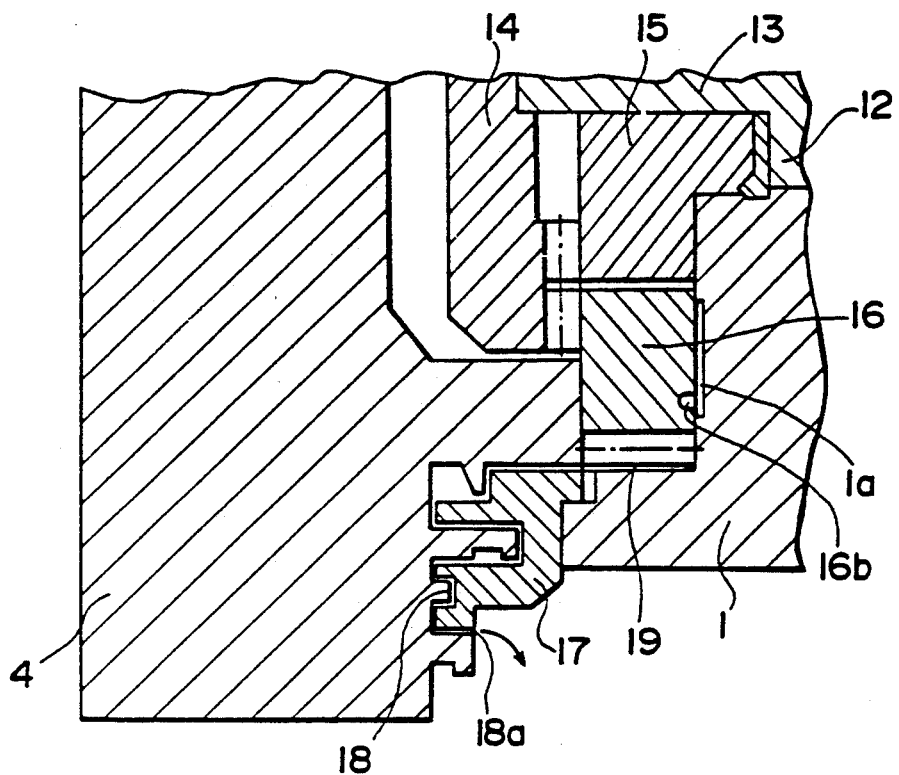
FIG. 3 is an enlarged fragmentary sectional view of the turret tool rest having a labyrinth clearance for a waterproof and dustproof method, shown in FIG. 2.

Referring now to the drawings, wherein like reference characters designate like or corresponding parts throughout the views and thus the repeated description thereof can be omitted for brevity, there is shown in FIGS. 2 and 3 one embodiment of a turret tool rest of a machine tool such as a lathe having a non-contact rotation waterproof and dustproof method according to the present invention.

As shown in FIG. 2, in the turret tool rest for the lathe, a rotary shaft 3 is rotatably mounted to a tool rest body 1 by using a plurality of bearings 2, and a turret 4 is concentrically secured to the end of the rotary shaft 3 by using a key 5. As a result, the rotary shaft 3 and the turret 4 are integrally rotated. Further, an intermediate shaft 6 is rotatably supported on the tool rest body 1 in parallel with the rotary shaft 3 by using a plurality of bearings 7, and a motor 8 having an output shaft 8a is secured to the tool rest body 1 in parallel with the intermediate shaft 6.

A pinion 9 fitted on the output shaft 8a of the motor 8 is engaged with a gear 10 fitted on the rear side of the intermediate shaft 6. Hence, the rotating force of the motor 8 is transmitted to the intermediate shaft 6 via the pinion 9 and the gear 10. Another pinion 11 attached to the front end of the intermediate shaft 6 is engaged with a clutch ring 16 connected with the turret 4. Thus, the rotating force is transmitted from the intermediate shaft 6 to the turret 4 via the pinion 11 and the clutch ring 16. Further, within the tool rest body 1, a hydraulic cylinder 12 having a hollow piston 13 is concentrically arranged around the rotary shaft 3, and a clutch plate 14 is concentrically arranged around the rotary shaft 3. An A clutch 14a is provided on the rear surface of the clutch plate 14.

On the other hand, a clutch sleeve 15 is secured to the front side surface of the hydraulic cylinder 12, and a B clutch 15a is provided on the front surface of the clutch sleeve 15. The clutch ring 16 having a C clutch 16a on its front surface is connected to the rear surface of the turret 4.

Now, when a pressure oil is supplied to a rear chamber 12a of the hydraulic cylinder 12, the clutch plate 14 connected to the hollow piston 13 is moved forward and the A clutch 14a of the clutch plate 14 is disconnected from the B clutch 15a of the clutch sleeve 15 and the C clutch 16a of the clutch ring 16. As a result, the turret 4 can be rotated by the rotating force transmitted from the motor 8 via the intermediate shaft 6 and clutch ring 16. On the other hand, when the pressure oil is supplied to a front chamber 12b of the hydraulic cylinder 12, the clutch plate 14 is moved backwards and the A clutch 14a of the clutch plate 14 is pushed and connected to the B clutch 15a of the clutch sleeve 15 and the C clutch 16a of the clutch ring 16. Hence, the turret 4 is integrally fixed to the tool rest body 1. Hence, positioning and clamping of the turret 4 with the cutter to the tool rest body 1 can be carried out, and cutting processing of the material can be performed.

As clearly shown in FIG. 2 and 3, a labyrinth ring 17 having an uneven surface is also mounted to the tool rest body 1 in a concentric position with the rotary shaft 3 and faces towards the turret 4. The turret 4 also has an uneven surface facing and corresponding to the uneven surface of the labyrinth ring 17. Hence, a labyrinth clearance 18 is formed between the uneven surfaces of the turret 4 and the labyrinth ring 17. In this case, the labyrinth clearance 18 is preferably determined to be at most 0.5 mm and thus chips or the like having a size of more than 0.5 mm can not enter the labyrinth clearance 18.

Figure 4:
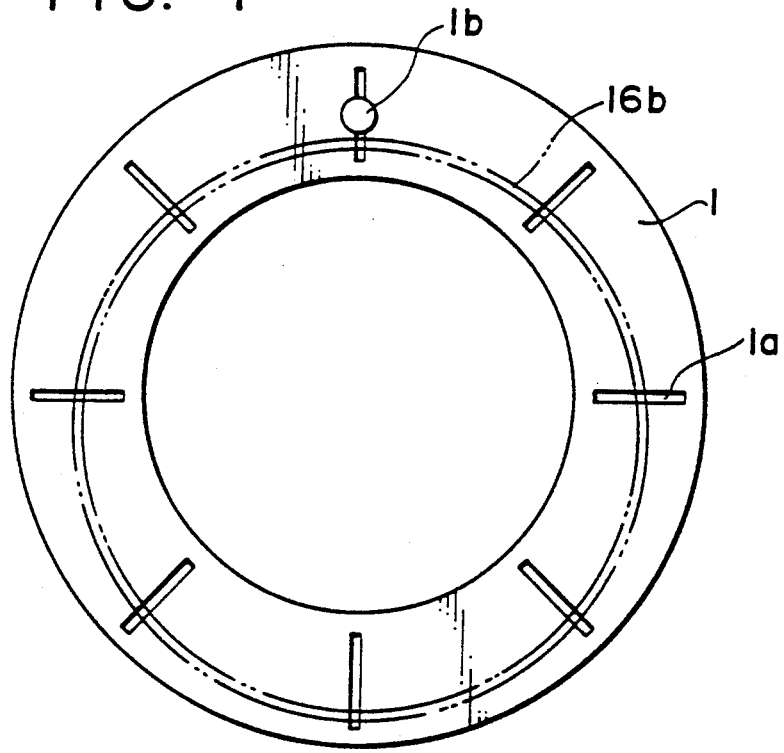
FIG. 4 is a schematic view showing fluid distribution grooves formed on a clutch ring and the turret tool rest of the machine tool shown in FIG. 2.
Figure 5:
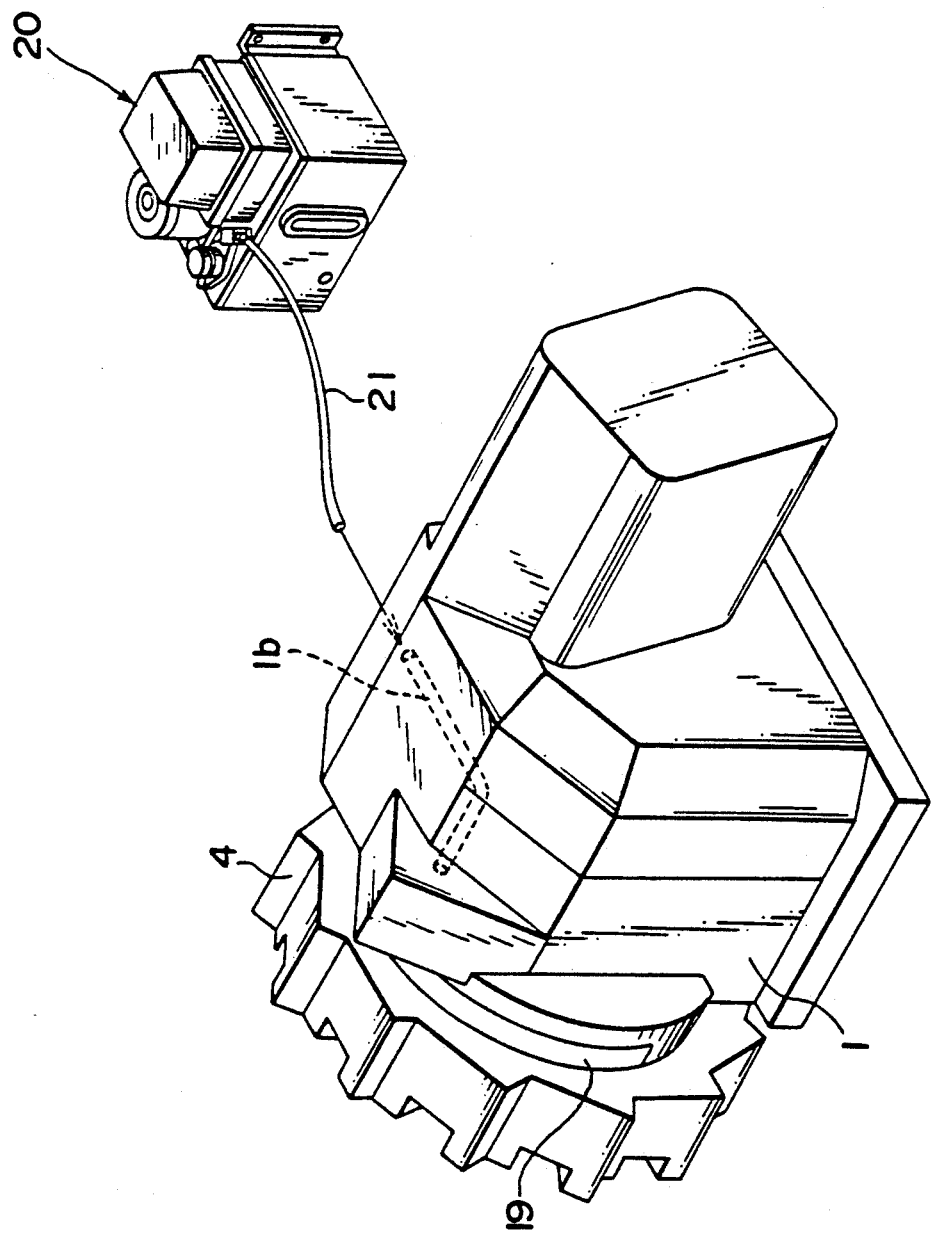
FIG. 5 is a perspective view of the turret tool rest and a fluid supply equipment of the machine shown in FIG. 2.

Further, when the turret 4 as a rotating body is rotated, the clutch ring 16 connected to the turret 4 is rotated in contact with the tool rest body 1 as a fixed body. At this time, in order to lubricate the contact surface between the clutch ring 16 and the tool rest body 1, a circular fluid distribution groove 16b is formed on the rear surface of the clutch ring 16 in an eccentric position from the center of the clutch ring 16, as shown by imaginary lines in FIG. 4, and a plurality of linear fluid distribution grooves 1a are also radially formed on the contact surface of the tool rest body 1 at an equal interval, as shown in FIGS. 3 and 4. Further, as shown in FIGS. 4 and 5, an L-shaped fluid supply path 1b opening to one of the fluid distribution grooves 1a is formed in the tool rest body 1, and a lubricant of a viscous fluid is continuously or intermittently supplied to the L-shaped fluid supply path 1b from a fluid supply equipment 20 through a connection hose 21. That is, the viscous fluid sent from the fluid supply equipment 20 is supplied from the L-shaped fluid supply path 1b to the contact surfaces of the clutch ring 16 and the tool rest body 1. Hence, the viscous fluid supplied from one fluid supply path 1b is distributed to the entire periphery of the clutch ring 16 and the linear fluid distribution grooves 1a formed on the tool rest body 1 by the circular fluid distribution groove 16b eccentrically formed on the clutch ring 16.

The viscous fluid supplied to the entire periphery of the clutch ring 16 is then supplied to the labyrinth clearance 18 through a clearance 19 between the clutch ring 16 and the tool rest body 1. That is, the viscous fluid is filled into the entire area of the labyrinth clearance 18 by a supply pressure of the fluid supply equipment 20, a transfer action caused by rotation when the turret 4 is positioned, and a capillary tube phenomenon of the viscous fluid. Then, the viscous fluid filled into the labyrinth clearance 18 is discharged to the outside from a labyrinth clearance end 18a by the supplying viscous fluid coming into the labyrinth clearance 18. That is, since the viscous fluid is continuously or intermittently supplied to the labyrinth clearance 18 from the fluid supply equipment 20, the labyrinth clearance 18 is always filled with new viscous fluid.

The viscous fluid supplied from the fluid supply equipment 20, for example, is an oil having a viscosity of approximately 68 CST at 40+C.

Figure 6A:
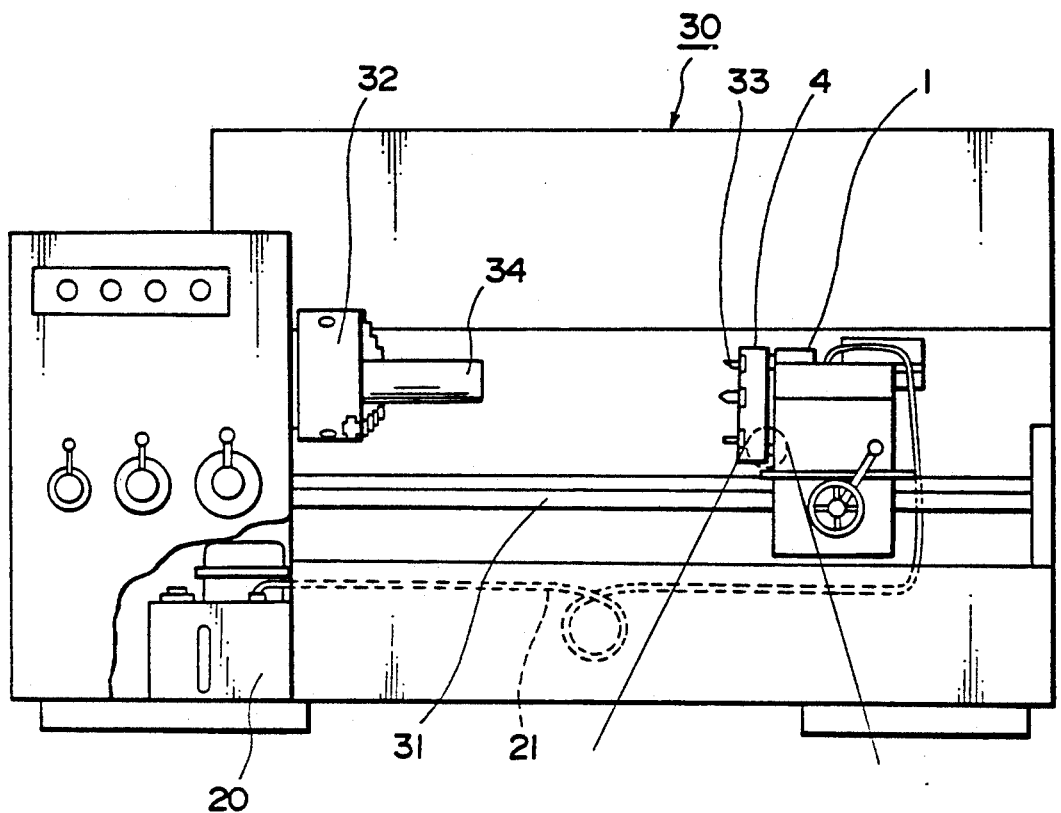
FIGS. 6(A & B) is an elevational view of a lathe having a turret tool rest of a machine tool according to the present invention.
Figure 6B:
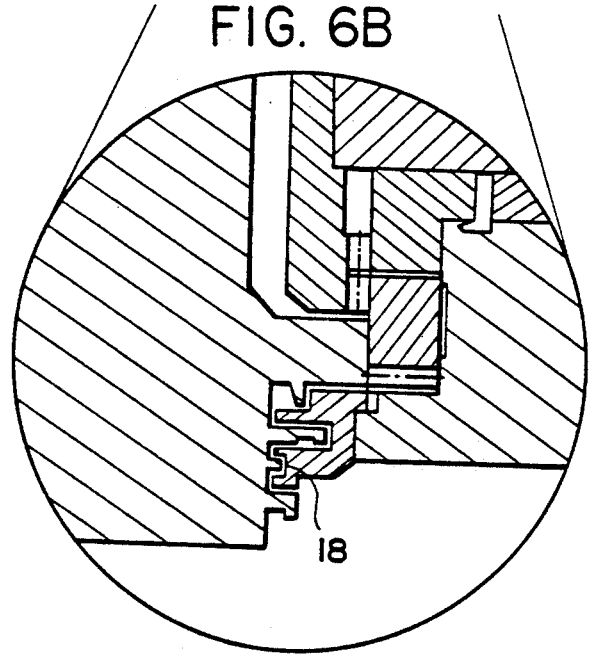

In FIG. 6, there is shown a lathe including a turret tool rest having the above-described construction according to the present invention. As shown in FIG. 6, in the lathe 30, a material 34 to be cut is clamped by a chuck 32, and by turning the chuck 32, the material 34 is cut by a cutter 33 held on the turret 4. The tool rest body 1 is slidable in the left and right side directions or the forward and backward directions along a bed 31 of the lathe 30 and the viscous fluid is supplied to the labyrinth clearance 18 of the tool rest body 1 from the fluid supply equipment 20 arranged within the 30 through the connection hose 21 so as to prevent the invasion or penetration of the chips produced by the cutting work, the cutting water or the like into the labyrinth clearance 18.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. A method of providing a waterproof and dustproof labyrinth clearance for non-contact rotation between a rotating body and a fixed body, comprising the steps of supplying a viscous fluid continuously into the labyrinth clearance independently of rotation of the rotating body via a supply path to an eccentrically arranged distribution groove on a clutch ring located between the rotating body and the fixed body and maintaining the continuous supply of the viscous fluid in the labyrinth clearance to prevent ingress of water and dust at both a rotating state and a non-rotating state of the rotating body.

2. The method of claim 1, wherein the labyrinth clearance is at most 0.5 mm.

3. A machine tool having a labyrinth clearance between a rotating body and a fixed body, comprising:
 a labyrinth clearance filled with a viscous fluid; and
 a fluid supply device for supplying the viscous fluid to the labyrinth clearance via a supply path to an eccentrically arranged distribution groove on a clutch ring located between the rotating body and the fixed body independently of rotation of the rotating body such that waterproof and dustproof protection is provided at both a stopped state and a rotating state of the rotating body.

4. The machine tool of claim 3, wherein the labyrinth clearance is at most 0.5 mm.

5. The machine tool of claim 4, wherein the rotating body is a turret tool rest for holding a plurality of cutters for cutting, and the fixed body is a tool rest body, and wherein a clearance between the turret tool rest and the tool rest body constitutes the labyrinth clearance.

6. The machine tool of claim 5, wherein the machine tool is a lathe.

7. The method of claim 1, wherein the supply of the viscous fluid is from an external source in constant communication with the labyrinth clearance.

8. The machine tool of claim 3, further comprising an external supply for the viscous fluid operatively arranged so as to be in constant communication with the labyrinth clearance.

9. The method of claim 1, wherein the step of supplying includes distributing the viscous fluid from the distribution groove over a peripheral surface of the clutch ring and to linear grooves on the fixed body adjacent the clutch ring.

10. The method of claim 1, wherein the step of maintaining the continuous supply includes flowing the viscous fluid from the peripheral surface of the clutch ring through a clearance between the clutch ring and the fixed body.

11. The method of claim 7, wherein the labyrinth clearance is at most 0.5 mm.

12. The method of claim 11, wherein the step of supplying includes distributing the viscous fluid from the distribution groove over a peripheral surface of the clutch ring and to linear grooves on the fixed body adjacent the clutch ring.

13. The method of claim 12, wherein the step of maintaining the continuous supply includes flowing the viscous fluid from the peripheral surface of the clutch ring through a clearance between the clutch ring and the fixed body.

14. The machine tool of claim 3, wherein the distribution groove is located to distribute viscous fluid over a peripheral surface of the clutch ring and to linear grooves on the fixed body adjacent the clutch ring.

15. The machine tool of claim 14, wherein a clearance is provided between the clutch ring and the fixed body to maintain the supply of the viscous fluid from the peripheral surface of the clutch ring.

* * * * *